United States Patent [19]
Pinson

[11] Patent Number: 4,577,116
[45] Date of Patent: Mar. 18, 1986

[54] SYSTEM FOR PROVIDING ELECTRICAL ENERGY TO A MISSILE AND THE LIKE

[75] Inventor: George T. Pinson, Huntsville, Ala.

[73] Assignee: The Boeing Company, Seattle, Wash.

[21] Appl. No.: 550,879

[22] Filed: Nov. 14, 1983

[51] Int. Cl.⁴ .................. F01D 15/10; H02K 21/12; H02P 9/04

[52] U.S. Cl. .................. 290/43; 290/52; 310/156

[58] Field of Search .............. 310/156; 290/52, 2, 290/43; 60/407, 410, 411; 322/35, 1

[56] References Cited

U.S. PATENT DOCUMENTS

| | | | |
|---|---|---|---|
| 2,463,538 | 3/1949 | Horrell | 290/52 |
| 3,024,366 | 3/1962 | Yanagimachi | 290/2 |
| 3,187,191 | 6/1965 | Baggs | 290/52 |
| 3,349,247 | 10/1967 | Birkestrand | 290/52 |
| 3,409,782 | 11/1968 | Bronicki | 290/2 |
| 3,921,052 | 11/1975 | Milano | 322/35 |
| 4,018,050 | 4/1977 | Murphy | 60/407 |

Primary Examiner—Stanley J. Witkowski
Assistant Examiner—Shelley Wade
Attorney, Agent, or Firm—Edwin H. Crabtree

[57] ABSTRACT

A system for providing electrical energy to a missile and the like. The system including a turbine driven by a gas supply on board the missile. The turbine driving a generator thereby eliminating batteries and other electrical power sources heretofore used on missiles. The generator includes spring biased magnetic vanes forming the turbine rotor.

4 Claims, 6 Drawing Figures

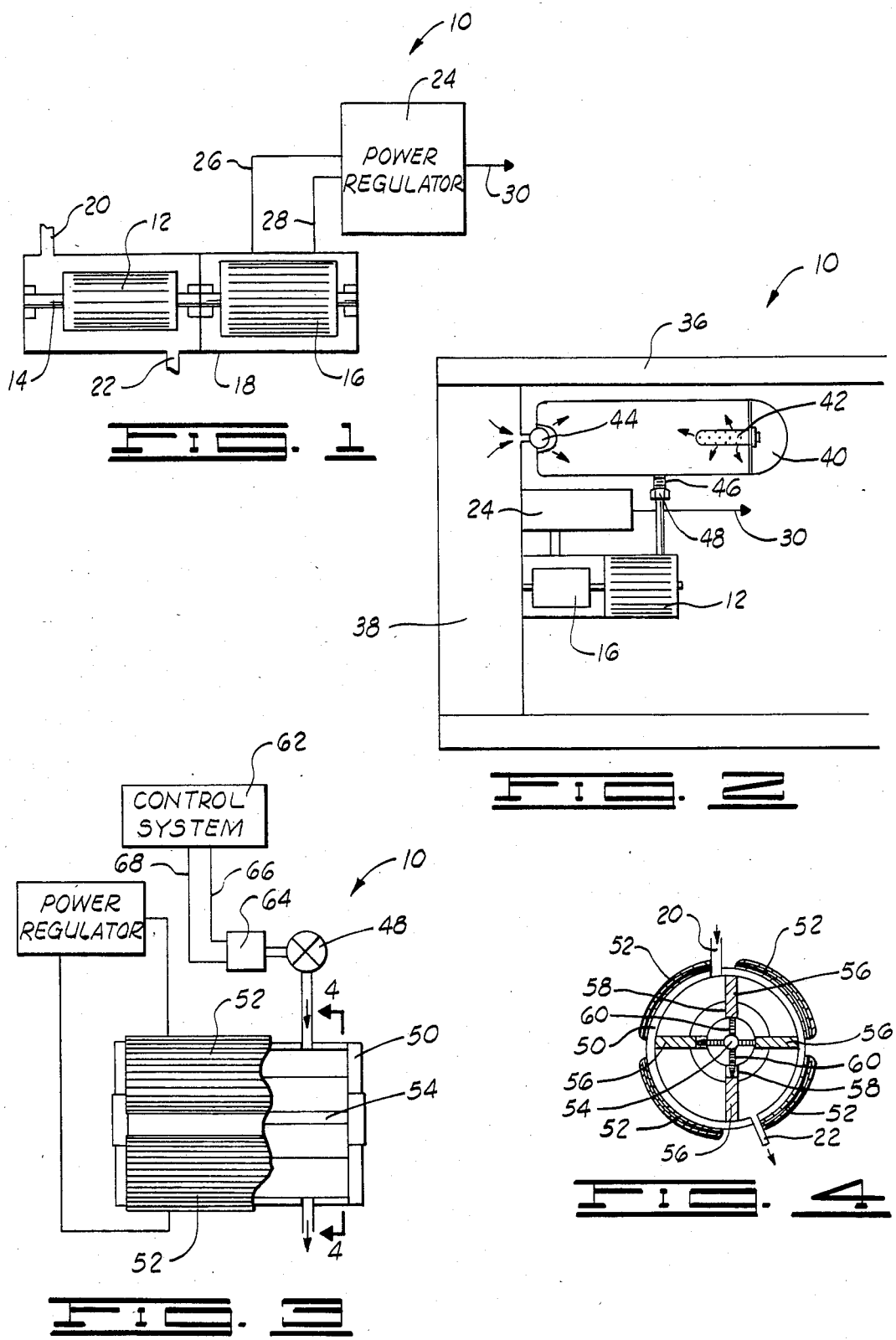

SYSTEM FOR PROVIDING ELECTRICAL ENERGY TO A MISSILE AND THE LIKE

BACKGROUND OF THE INVENTION

The subject invention is a system for providing electrical energy provided by a turbine driven generator and more particularly but not by way of limitation to a system having a turbine driven generator for providing electrical energy to a missile and the like.

Current controllable smart missiles require the use of electric power for various functions. This power is almost always obtained from batteries, either replaceable prior to firing for the small missiles or thermal batteries activated at the time of launch, or more commonly prior to launch. These batteries are usually activated by an electrical squib requiring external power for activation. These thermal and chemical batteries are costly and present a hazard if they are accidentally activated. They also suffer from the disadvantage that once the battery is activated, the reaction cannot be stopped. A decision not to fire the missile produces a live round that must be deactivated by launch personnel or safing until the battery is discharged. To replace the battery often requires that the missile be partially disassembled and rebuilt which can be a hazardous and costly operation.

Heretofore, there have been various types of electrical generators driven by turbines, alternators and other types of stored gas systems for driving turbines or generators. These types of devices are described in the following U.S. patents: U.S. Pat. No. 2,984,751 to Cliborn, U.S. Pat. No. 3,039,007 to Williams et al, U.S. Pat. No. 3,157,793 to Adkins, U.S. Pat. No. 3,243,621 to Wesolowski, U.S. Pat. No. 4,073,069 to Basmajian, U.S. Pat. No. 4,155,022 to Crockett, U.S. Pat. No. 4,208,592 to Leibow and U.S. Pat. No. 4,229,661 to Mead. None of the above mentioned patent particularly provide the unique structure and advantages of the subject invention as described herein for providing an electrical source on board a missile and the like.

SUMMARY OF THE INVENTION

The subject invention is designed to replace batteries and other electrical power sources heretofore used in missiles and the like. The gas driven turbine and generator may be driven by an external gas supply stored on board the missile.

The system is inexpensive and does not require thermal or chemical batteries which are costly and present a hazard if accidently activated.

The system is compact in size and is readily adaptable for different types and sizes of missiles, aircraft and other vehicles requiring an on board system for providing electrical energy.

The system includes a gas regulator connected to a gas source via a gas line. The gas source is connected to an integrated turbine having a turbine rotor mounted on a turbine housing. The housing having a gas inlet connected to the gas line and a gas outlet. The turbine is driven by expanded gas received in the housing. A generator having a generator rotor connected to and driven by the turbine rotor is adapted for connection to the electrical system of the missile. A power regulator is connected to the generator for regulating the amount of power to the missile's electrical system.

The advantages and objects of the invention will become evident from the following detailed description of the drawings when read in connection with the accompanying drawings which illustrate preferred embodiments of the invention.

BRIEF DESCRIPTION OF THE DRAWINGS

In FIG. 1 a schematic of a portion of the pneumatically powered electrical generator system is shown.

FIG. 2 illustrates an application of the system for providing electrical energy on a missile.

FIG. 3 illustrates an integrated turbine and generator used in the system.

FIG. 4 is a front sectional view of the turbine and generator taken along lines 4—4 shown in FIG. 3.

DETAILED DESCRIPTION OF THE DRAWINGS

Figure 5:
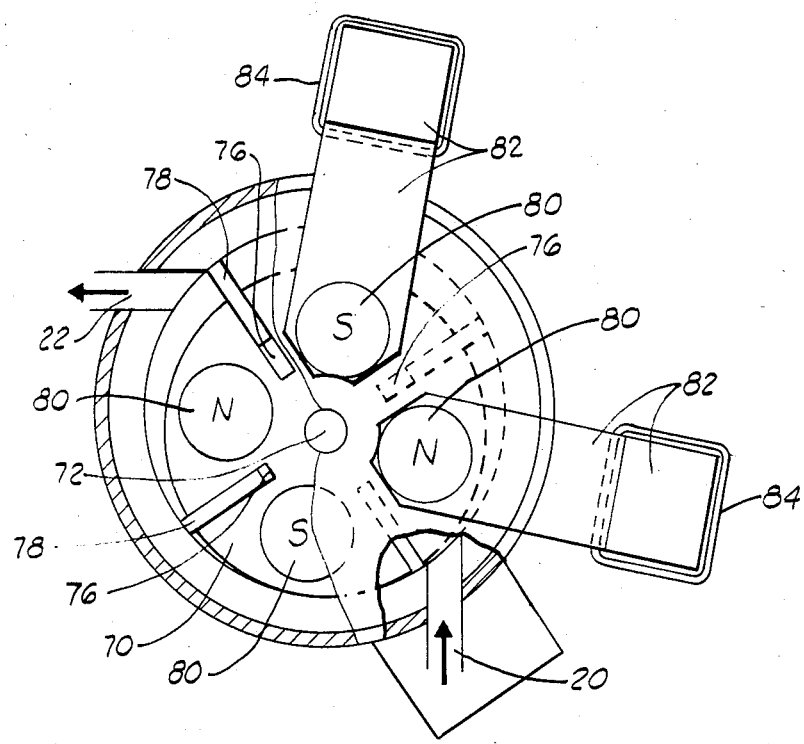
FIG. 5 is a front sectional view of an alternate embodiment of the turbine and generator taken along lines 4—4 shown in FIG. 3.

In FIG. 1 the system for providing electrical energy to a missile and the like is designated by general reference numeral 10 and broadly includes a gas driven turbine 12 having a turbine rotor 14 connected to and driving a generator 16. The turbine 12 and rotor 14 are received in a common housing 18. The housing 18 further includes a gas inlet 20 and a gas outlet 22. The gas turbine 12 is driven by an external gas supply through the gas inlet 20.

A power generator 24 is connected to the turbine 16 via leads 26 and 28 for regulating the power to the electrical system of a missile via lead 30.

In FIG. 2 a portion of a missile 36 is shown having an external gas chamber 38 and a pressure gas bottle 40. Gas may be provided by the bottle 40 which is charged by a gas generator 42 or by gas generated in the common chamber 38. In the latter case, hot gases pass through a one-way valve 44 to pressurize the bottle 40. The gases are then filtered through a filter 46 and then through a gas regulator 48 prior to entrance into the housing 18.

To reduce the complexity, size and cost of the system 10 as shown in FIGS. 1 and 2 a preferred embodiment is shown in FIG. 3 and FIG. 4 wherein the turbine 12 and generator 18 are integrally combined providing a positive displacement vane type or axial flow turbine motor having a common housing 50 with sets of field coils 52 placed parallel to a turbine rotor 54. The rotor 54 includes a plurality of permanent magnets 56 shown in FIG. 4, slidably mounted as vanes in the rotor 54 so that a magnetic field is produced which cuts the field coils 52 thereby producing an induced electrical current in the windings 52. The permanent magnets 56 are eccentrically mounted in the rotor 54 in slots 56 and are spring biased by coil springs 60 so the magnets 56 are held in close proximity to the field coils 52 as they are rotated thereby to induce the electrical current in the windings 52.

A control system 62 monitors the power generated by the system 10 and operates an electrical control valve 64 via leads 66 and 68. The valve 64 is connected to the gas generator 48 to increase and decrease the gas flow rate thereby increasing or decreasing the speed of the turbine rotor 54.

Figure 6:
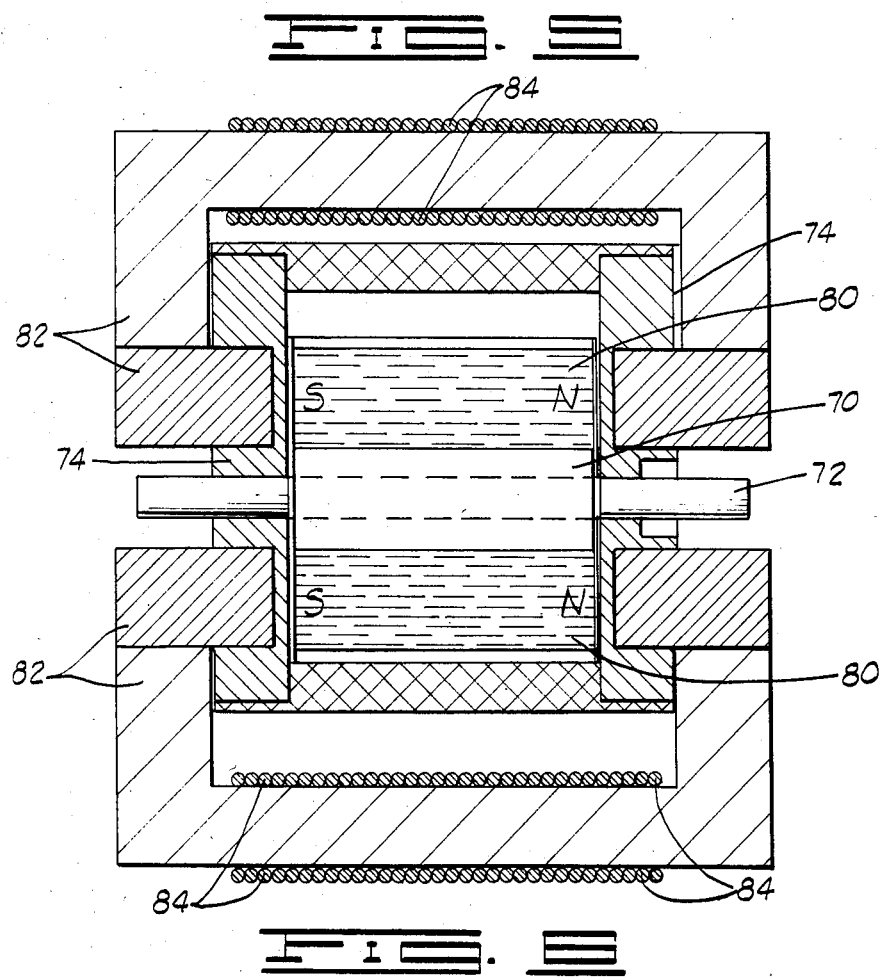
FIG. 6 is a side sectional view of the turbine and generator shown in FIG. 5.

In FIGS. 5 and 6 an alternate embodiment of the turbine 12 and generator 16 is shown. In FIG. 5 a front sectional view of the turbine 12 and generator 16 is shown taken along lines 4—4 shown in FIG. 3. FIG. 6 is a side sectional view of the turbine 12 and generator 16. A rotor 70 is shown having a cylindrical shape with a shaft 72 extending outwardly from each end and suported in a housing 74. The rotor 70 has four slots 76 therein for receiving vanes 78.

The rotor 70 includes four embedded magnets 80 with their poles in each of the four quadrants between the vane slots 76. The poles of the magnets 80 are alternated between adjacent magnets 80.

The vanes 78 are placed in the slots 76 in the rotor 70 and assembled in the cylindrical housing 74. The housing 74 has ports positioned around its circumference and connected to the gas inlet 20 and exhaust outlet 22. The ports are not shown in the drawings.

There are four soft iron cores 82 with coils 84 wrapped therearound and equally spaced around the rotor 70 and housing 74. The soft iron cores 82 are made in two or more components so they may be assembled in counter bores in the housing 74.

As the magnets 80 rotate on the rotor 70 and pass the cores 82 a magnetic flex is created which induces an electrical current in the windings of the field coils 84.

While the embodiments shown in FIGS. 3, 4, 5 and 6 are preferred it can be appreciated that various other combinations of the turbine 12 and generator 16 operating with an on-board gas supply disposed in the missile can work equally well without departing from the spirit or scope of the invention as described herein.

Changes may be made in the construction and arrangement of the parts or elements of the embodiments as described herein without departing from the spirit or scope of the invention defined in the following claims.

What is claimed is:
1. A system for providing electrical energy to a missile and the like, the system comprising:
   a gas source adapted tor receipt on board the missile;
   a gas regulator connected to the gas source via a gas line;
   an integrated turbine driven generator having a generator housing, the housing having field coils mounted thereon, the housing also having a gas inlet connected to the gas line and a gas outlet, a turbine rotor received in the housing and having spring bias magnetic vanes slidable mounted therein and forming a positive displacement vane motor, the vanes rotating the rotor by gas expansion and the magnetic field set up therein cuts the field coils for providing an induced electrical current; and
   a power regulator connected to the field coils for regulating the amount of power to the missile's electrical system.
2. The system as described in claim 1 further including a control system for monitoring the power generated by the turbine driven generator, the control system connected to an electrical control valve, the valve connected to the gas regulator for controlling an increase or decrease of the gas thereby increasing and decreasing the speed of the turbine rotor.
3. The system as described in claim 1 wherein the gas source is a pressurized gas bottle charged by a gas generator in the bottle.
4. The system as described in claim 1 wherein the gas source is a pressurized gas bottle charged by a common gas chamber, the gas discharged from the chamber to the bottle via a one-way valve.

* * * * *